United States Patent [19]
Sakamoto et al.

[11] Patent Number: 5,421,129
[45] Date of Patent: Jun. 6, 1995

[54] VIBRATION CONTROL DEVICE FOR STRUCTURE

[75] Inventors: Mitsuo Sakamoto; Norihide Koshika; Isao Nishimura; Katsuyasu Sasaki; Satoshi Orui, all of Tokyo, Japan

[73] Assignee: Kajima Corporation, Tokyo, Japan

[21] Appl. No.: 9,715

[22] Filed: Jan. 27, 1993

[30] Foreign Application Priority Data

Jan. 28, 1992 [JP] Japan .................. 4-12743

[51] Int. Cl.⁶ .................. E04H 9/02; E02D 27/34; E04B 1/98
[52] U.S. Cl. .................. 52/167.1; 52/167.2; 52/167.6; 52/167.7; 52/167.8
[58] Field of Search .................. 52/1, 167 R, 167 DF, 52/167 RM, 167 RS, 167 RA, 167 E, 167 EA; 188/378, 379, 380; 248/638, 539

[56] References Cited

U.S. PATENT DOCUMENTS

| | | | |
|---|---|---|---|
| 3,483,951 | 12/1969 | Bonesho et al. | 188/379 |
| 4,662,133 | 5/1987 | Kondo | 248/638 X |
| 4,807,840 | 2/1989 | Baker et al. | 52/167 DF X |
| 4,924,640 | 5/1990 | Suizu et al. | 52/167 DF |
| 4,926,985 | 5/1990 | Mizuno et al. | 188/378 |
| 5,025,599 | 6/1991 | Ishii et al. | 52/167 DF X |
| 5,168,967 | 12/1992 | Abiru et al. | 188/378 |
| 5,182,887 | 2/1993 | Uno et al. | 52/167 R |
| 5,255,764 | 10/1993 | Kurabayashi et al. | 52/1 X |
| 5,265,387 | 11/1993 | Ishimara et al. | 52/167 R |

FOREIGN PATENT DOCUMENTS

| | | | |
|---|---|---|---|
| 316076 | 10/1988 | European Pat. Off. | |
| 59-89848 | 9/1984 | Japan | |
| 63-297837 | 3/1989 | Japan | |
| 1-318671 | 3/1990 | Japan | |
| 0221568 | 9/1990 | Japan | 52/167 DF |
| 2-267969 | 9/1990 | Japan | |
| 0069774 | 3/1991 | Japan | 52/1 |

OTHER PUBLICATIONS

PCT Application—WO-92/21840—Japan pub. Dec. 10, 1992.
PCT Application—WO-92/21841—Japan pub. Dec. 10, 1992.

*Primary Examiner*—Carl D. Friedman
*Assistant Examiner*—Robert J. Canfield
*Attorney, Agent, or Firm*—James H. Tilberry

[57] ABSTRACT

A seismic vibration control device for structures which employs a combination of primary and secondary vibratable masses to attenuate the vibration of a structure. The primary vibratable mass is passive and is supported on the structure. One or more active secondary vibratable masses are supported on the primary mass. Control forces are selectively applied to the secondary masses to control the period of the primary mass in a manner which is most effective to attenuate the seismic vibration of the structure.

21 Claims, 6 Drawing Sheets

VIBRATION CONTROL DEVICE FOR STRUCTURE

BACKGROUND OF THE INVENTION

1. Field of the Invention

The field of invention relates to both active and passive mass damper vibration control devices for reducing the vibrational response of a structure to an earthquake, wind, or the like.

2. Description of the Prior Art

A dynamic damper (hereinafter designated as a DD) may function as a vibration control device for a structure such as described, by way of example, in Japanese Pat. Laid-open No. 63-76932 and Japanese Pat. Publication No. 3-38386.

A prior art vibration model of a DD to be applied to a structure is also shown in FIG. 12 of the subject application, wherein $m_1$ is the mass of the main body of the structure, comprising the main vibration system, and an additional mass body $m_d$ comprises the damping system. A spring constant of the main body of the structure is identified as $k_1$. Masses $m_1$ and $m_d$ are connected by a spring having a spring constant $k_d$ and a damper having a damping coefficient $c_d$. Displacement of the structure mass $m_1$ is indicated by the arrow $x_1$, and displacement of the mass $m_d$ is indicated by the arrow $x_d$.

A natural angular frequency of the main vibration system is given by:

$$\omega_1 = (k_1/m_1)^{\frac{1}{2}}$$

In the DD, a mass $m_d$ of tile damping system is designed so that the ratio of the mass $m_d$ to the mass $m_1$ of the main vibration system may be set to approximately become:

$$\mu = m_d/m_1 \geqq 0.01$$

The natural angular frequency of the damping system is given by:

$$\omega_d = (1/1+\mu)\omega_1$$

A damping coefficient $c_d$ and a damping factor $h_d$ are represented by the following equations, respectively.

$$c_d = 2 m_d \omega_d h_d$$

$$h_d = [3\mu/8(1+\mu)]^{\frac{1}{2}}$$

A prior art active mass damper (hereinafter AMD) used as an active type vibration control device is disclosed in U.S. Pat. No. 5,022,201.

FIG. 13 of the subject application shows a prior art vibration model of an AMD in which control force actuator means u(t), such as hydraulic power means or electromagnetic force means, is positioned between the main body of the structure having a mass $m_1$ and the additional mass body having a mass $m_d$ to actively control the vibration of the structure.

In the AMP, assuming that the modulus of the spring between the main body of the structure and the additional mass body comprising the vibration control device is expressed by the equation $$\omega_d \leqq (\tfrac{1}{2})\omega_1$$

the control force u(t) is given by the following equation:

$$u(t) = G_1(dx_1/dt) \; G_2 (dx_d/dt)$$

wherein $G_1$ is a gain in a circuit, including an automatic gain control circuit (AGC) or the like, against the response speed of the structure, and attains the correspondence of large inputs through small inputs (wherein $G_2$ becomes a negative value). The second term in the above equation gives a damping property to the side of the additional mass body as well, and attains a stability thereof by adding the product of a gain $G_2$ and a vibration speed on the side of the additional mass body to the control force.

There are some studies which try to add a spring having its spring constant $k_d$ to the AMD described above in parallel with the control force due to the actuator as shown in the vibration model of FIG. 14 and to obtain a vibration control effect to a certain degree with the control force of the AMD by means of less control force in comparison with that of an active tuned mass damper (hereinafter designated as ATMD).

In an ATMD, a spring constant $k_d$ is set so that the vibration of an additional mass body may synchronize with that of a structure, that is, $$\omega_d = \omega_1$$

and the control force u(t) is, for example, given by the following equation:

$$u(t) = G_1(dx_1/dt) + G_2(dx_d/dt) + G_3(x_1 - x_d)$$

wherein $G_3$ is a gain having a negative sign and cancels a part of the inertial force applying on the additional mass body at a vibration time due to the third term in the above equation, so that the additional mass body may be vibrated by less control force.

Japanese Patent Publication No. 3-70075 discloses a vibration control device of an active type having a pattern for controlling the structural vibration due to an earthquake or the like by connecting a second additional mass body having a mass less than the additional mass body of the DD to the additional mass body of the DD through a spring and an actuator and by applying a control force on the second additional mass body from the actuator.

With reference to tile control direction of each prior art vibration control device described above, two kinds of systems can usually be considered depending on tile supporting method for an additional mass body to a structure:

(a) A system where only one vibration control device controls in all directions.

For example, an additional mass body is vibrated in all the directions within a horizontal plane and it is possible to maintain control in all directions by one vibration control device when the additional mass body is supported by a laminated rubber support, or a ball bearing, or is hung and supported by a universal joint or the like.

(b) A system where one vibration control device controls in only one direction.

For example, in the case of connecting an additional mass body to a structure with a coil spring in a horizontal direction while supporting the additional mass body with a linear guide (straight rail or linear guide shaft or the like) or sliding the additional mass body along a circular track or in case of hanging and supporting the additional mass body with a hanger means, the vibation direction of the additional mass body is one-directional and only one-directional control is possible.

For the purpose of obtaining sufficient vibration control, however, the additional prior art mass body becomes very heavy and the problems increase.

One vibration control device can control in all directions, or, of course, a plurality of vibration control devices can be used. It is also possible to control in all directions with respect to a horizontal displacement by the combination of two-directional controls. In the case of (a) above, the advantage is that there is no waste with respect to the mass of the additional mass body. However, a mechanism for providing a control force and the control for the mechanism become complicated when applied to AMD or ATMD. In the case of (b) above, if it is desired to control in two directions within the horizontal plane of a structure, each vibration control device must be mounted separately in two directions. The additional mass body of the vibration control device in each separate direction does not function as a vibration control in a specific direction, and the vibration control device takes more space while the weight of total additional mass bodies increases in relation to the weight of the structure.

The present invention intends to solve the issues described above in the vibration control devices of the prior art. It is, accordingly, among the objects of the present invention to provide a vibration control device that can be operated by a minimal supply of energy and a minimal control force to effectively control the vibration of a structure against an earthquake, and which has a simple control mechanism wherein the weight of an additional mass body and the installation space for the device are minimized.

SUMMARY OF THE INVENTION

Assuming the basic components of a DD comprise a first additional mass body, the vibration control device of the present invention comprises a plurality of second mass bodies constituting AMD or ATMD added to the first additional mass body. More specifically, the inventive vibration control device comprises a first additional mass body having a predetermined mass which is movable relative to the structure; support means interposed between the structure and the first additional mass body which provides a period that is synchronized with the natural period of the structure; a second additional mass body having a predetermined mass which is movable relative to the first additional mass body; and drive means for applying a control force between the first and second additional mass bodies movable in two or more directions relative to the first additional mass body.

In the vibration control device of the present invention, a vibration control effect can be obtained in all directions over a horizontal plane by use of one first additional mass body (the first additional mass body of each device in case a plurality of vibration control devices are provided) which is not directly connected to the drive means but is vibratable in all directions over the horizontal plane.

As support means for permitting the first additional mass body to be vibratable in all directions over the horizontal plane, several mechanisms are contemplated: suspension hanger means; universal joints; laminated rubber support means; ball bearing support means; and shiftable linear guide supports adapted to be movable relative to each other.

With reference to the laminated rubber support, it is contemplated that it be hollow in its axial direction to decrease horizontal stiffness and to provide for a longer period. Also, a rubber material is selected which inherently possesses a high damping property. A coil spring may be used for connecting the structure to the first additional mass body in a horizontal direction concurrently with the use of the laminated rubber support. The ball bearing support or the linear guide support may be combined with the spring coil and/or laminated rubber support in order to obtain a neutral damping position and for adjusting a damping constant of the inventive system.

With reference to a second additional mass body directly receiving a control force from the drive means, both the drive means and the control means are simplified by restricting vibration to one direction. By so doing, efficient and high precision control is obtained over the response of the structure to the earthquake or the like. When two or more second additional mass bodies are used to coact with the first additional mass body, ultimately multi-directional control forces are indirectly applied to the first additional mass body, whereby the response of the structure can be controlled in all directions within a horizontal plane.

Drive means for applying a control force on the second additional mass body include, for example, rotary or linear electric motors and hydraulic motors which are controlled by the response of the structure to an external force such as an earthquake, wind, or the like.

OBJECTS OF THE INVENTION

It is among the objects of the invention to provide a plurality of controlled second additional mass bodies to coact with a first additional mass body, whereby multi-directional control forces are indirectly applied to the first additional mass body by the second additional mass bodies, resulting in a control of the response of the structure in all directions within a horizontal plane.

It is another object of the invention to provide second additional mass bodies which are so lightweight in comparison with the weight of the first additional mass body that they contribute substantially no significant increase in the weight of the vibration control device as a whole.

It is a further object of the invention to obtain very effective vibration control with a drive having an extremely small mass body.

It is yet another object of the invention to provide a control device that will be safe to operate and will not damage the structure in the event that the inventive device should malfunction.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
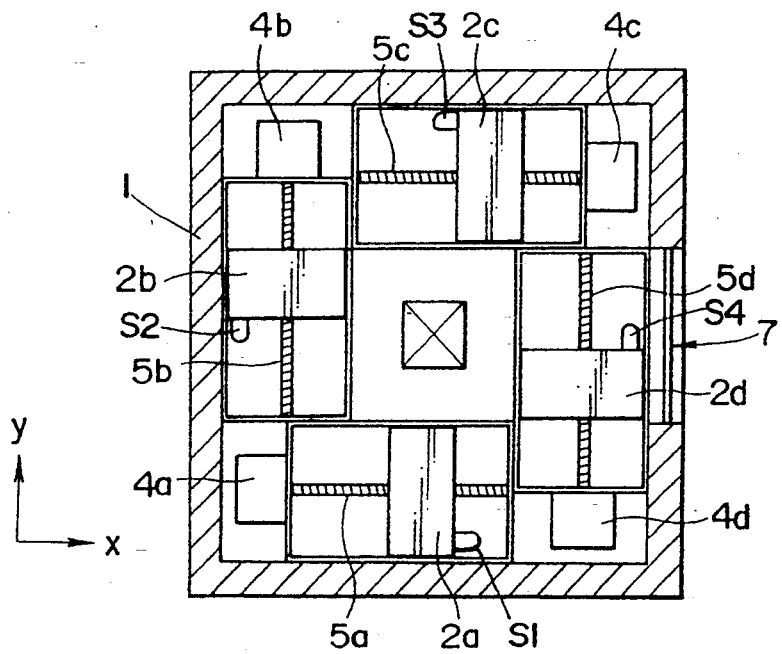
FIG. 1 is a partially sectioned plan view of a preferred embodiment of the present invention.
Figure 2:
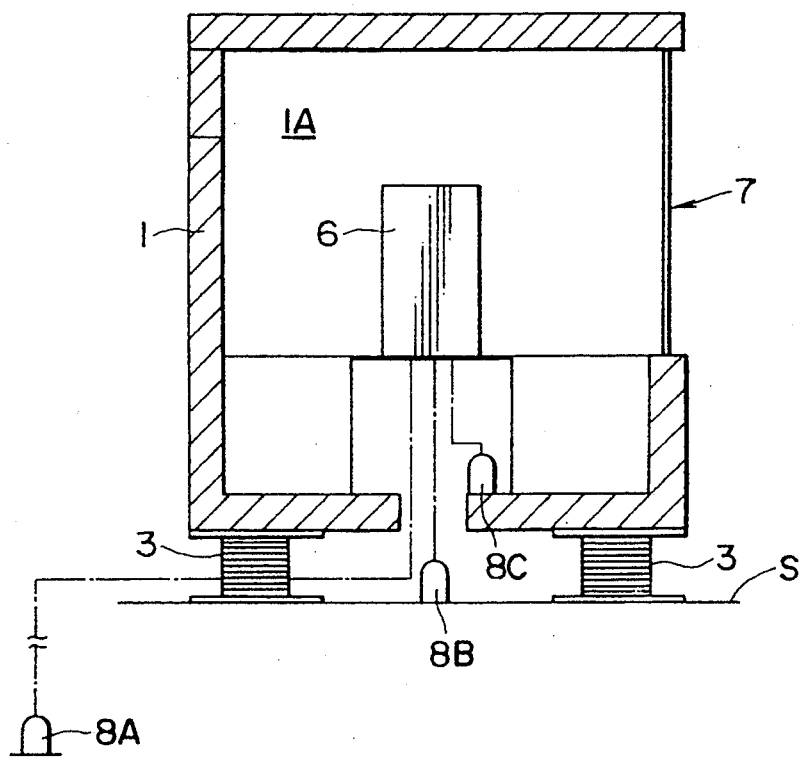
FIG. 2 is a partially sectioned elevational view of the preferred embodiment of the invention shown in FIG. 1.

In the preferred embodiment of the invention shown in FIGS. 1 and 2, a first additional mass body 1, constituting a vibration control device, comprises a chamber 1A, and four additional mass bodies 2a, 2b, 2c, and 2d are incorporated into the interior of the first additional mass body chamber 1A. The first additional mass body 1 rests on a structure S.

The first additional mass body 1 is supported by a plurality of laminated rubber supports 3 as support means and can be vibrated in all directions within a horizontal plane thereof. Each laminated rubber support 3 is designed to provide a spring constant corresponding to the natural period of a structure. However, in case the natural period of the structure is largely different depending on a direction thereof (e.g., x-axial and y-axial directions illustrated in the figure), it is also possible to correspond the natural period of the structure to the spring constant by altering the sectional shape of each laminated rubber support 3 and devising a support means for the laminated rubber support. However, an oil damper, a viscous damper, an elasto-plastic damper or another appropriate damper may also be interposed between the structure and the first additional mass body 1, separate from each laminated rubber support 3.

As drive means, AC servo motors 4(a-d) and threaded shafts 5(a-d), respectively, are drivingly threaded to the second additional mass bodies 2(a-d). The movement of the second additional mass bodies 2(a-d) is restricted to the axial alignment of the shafts 5(a-d). Two of the second additional mass bodies 2a and 2c are vibrated in the FIG. 1 x-axial direction, while the other two of the second additional mass bodies 2b and 2d are vibrated in the FIG. 1 y-axial direction.

In the present preferred embodiment, a device 6 for controlling the forces applied to the second additional mass bodies 2(a-d) is also placed and secured in the interior of the first additional mass body 1. An inspection port 7 provides access to the interior of additional mass body 1 for maintenance purposes.

It is contemplated that a spring (not shown), such as a coil spring, may be secured in parallel with the shafts 5(a-d) to return the additional mass bodies 2(a-d) to a neutral position. The coil spring will act to obtain a predetermined vibration control with minimal control force similar to the ATMD.

In FIG. 2, 8a indicates a sensor (vibrograph) for detecting ground level vibrations. A sensor 8B detects seismic vibration of the structure, and sensor 8C detects seismic vibration of the first additional mass body 1. The second additional mass bodies 2(a-d) are installed with sensors S(1-4), respectively, for detecting vibration, and each can be controlled by the feedback of each detected value.

Figure 3:
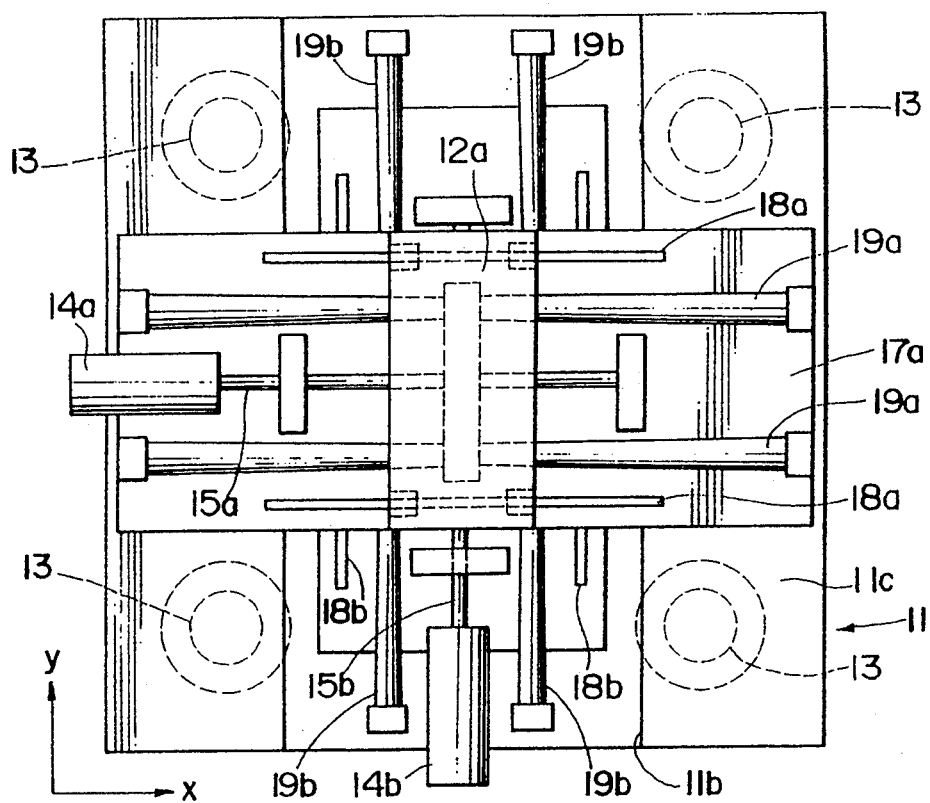
FIG. 3 is a plan view of another preferred embodiment of the present invention.
Figure 4:
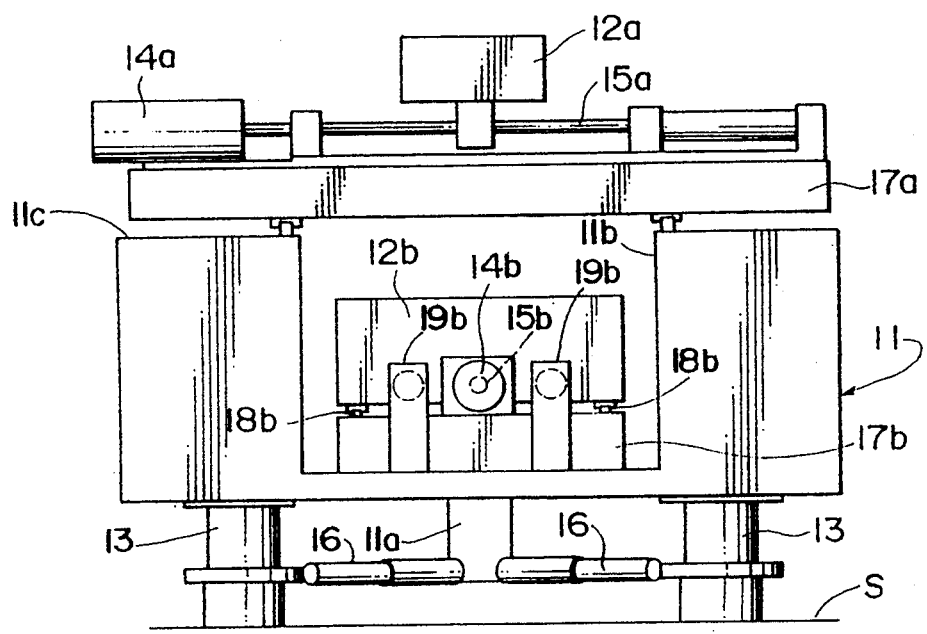
FIG. 4 is an elevational view of the preferred embodiment of the invention shown in FIG. 3.

In the preferred embodiment of the invention shown in FIGS. 3 and 4, a first additional mass body 11, with a channel 11b, is made of a steel material or the like, and is supported by four laminated rubber supports 13, which, in turn, are supported by structure S. The bottom center portion 11a of the first additional mass body 11 is connected to each laminated rubber support 13 through a horizontally arranged damper 16 of a cylinder type, so that a predetermined damping property may be added.

The second additional mass body 12a is slidable along x-directional rails 18a mounted on a frame 17a bridged over the upper portion 11C of the first additional mass body 11 so that the second additional mass body 12a is vibrated on the x-directional rails 18a by reciprocating a rotatable threaded shaft 15a under the control of an AC servo motor 14a. Horizontal coil springs 19a are provided in parallel with the shaft 15a to give a predetermined spring constant to the second additional mass body 12a. For keeping the neutral position of the second additional mass body 12a, the spring constant usually provides a long period in comparison with the natural period of the structure. However, the spring constant is synchronized with the period of the first additional mass body 11 in order to permit the use of an ATMD-like control.

A third additional mass body 12b is mounted in channel 11b for reciprocal movement normal to second additional mass body 12a on y-directional rails 18b tranverse to the x-directional rails, as shown by the x-y coordinates of FIG. 3. Third additional mass body 12b is vibrated on the y-directional rails 18b by reciprocating a rotatable threaded shaft 15b under the control of an AC servo motor 14b. Horizontal coil springs 19b are provided in parallel with shaft 15b to give a predetermined spring constant to the third additional mass body 12b. For keeping the neutral position of the third additional mass body 12b, the spring constant provides a long constant, the same as the spring constant of coil springs 19a. Also, the same as coil springs 19a, the spring constant of coil springs 19b is synchronized with the period of the first additional mass body 11 in order to permit the use of an ATMD-like control.

FIGS. 5 through 10 show combinations of support means for allowing a first additional mass body 31 to vibrate in all directions within a horizontal plane and second support means for allowing a second additional mass body 32 to vibrate in a specific direction within a horizontal plane, respectively. In each figure, support means 33 rests on a structure S. For simplification of explanation, the second additional mass body 32 is shown for movement in only one direction. However, support means to permit movement in two or more directions are within the contemplation of the invention.

Figure 5:
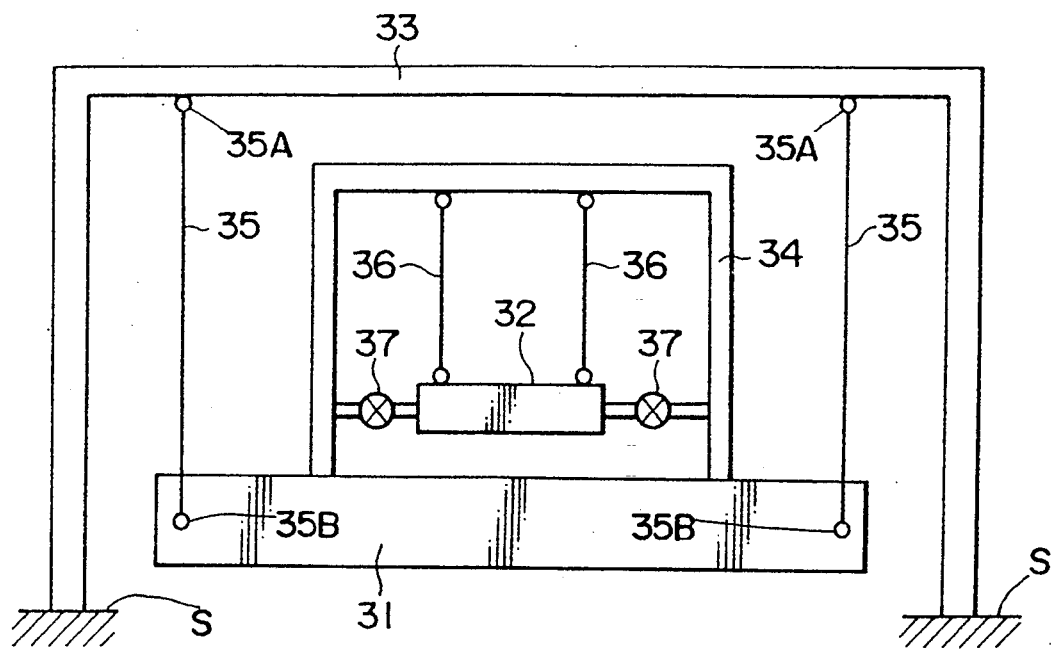
FIG. 5 is a schematic elevational view of a preferred embodiment of the invention showing a combination of first support means and second support means.

In the embodiment of FIG. 5, the first and second additional mass bodies 31 and 32 are hung and supported by hanger means 35 and 36, respectively, from support frames 33 and 34, respectively, whereby a control force may be applied to the second additional mass body 32 by means of actuator 37. Support frame 33 rests on structure S. The hanger means 35 of the first additional mass body 31 allows vibration of the additional mass body 31 in all horizontal directions by, for example, providing universal joints 35A and 35B. The second additional mass body 32 may be vibrated in only one direction, but the direction of vibration can be restricted by the actuating direction of the actuators 37.

Figure 6:
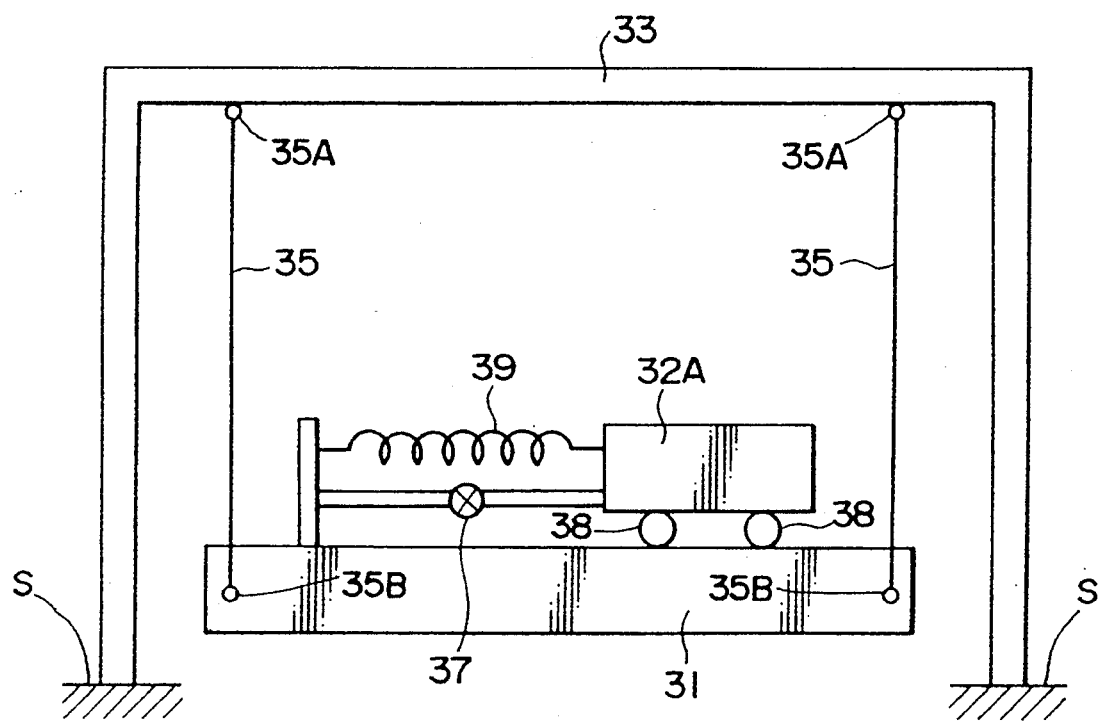
FIG. 6 is a schematic elevational view of another preferred embodiment of the invention showing another combination of first support means and second support means.

In the embodiment of FIG. 6, support means 33 rests on structure S. The hanger means 35 of the first additional mass body 31 is similar to hanger means 35 of FIG. 5. The second additional mass body 32A is arranged so as to slide on the first additional mass body 31 with anti-friction means, such as rollers 38. The direction of movement of mass body 32A can be controlled by the rotational direction of the rollers 38, the axial alignment of coil spring 39, connected between the second additional mass body 32A and first additional mass body 31, and the axial alignment of the actuator 37. In lieu of rollers 38, it is contemplated that mass body 32A be vibrated on rail means, such as rail means 18$a$ or 18$b$ of FIGS. 3 and 4.

Figure 7:
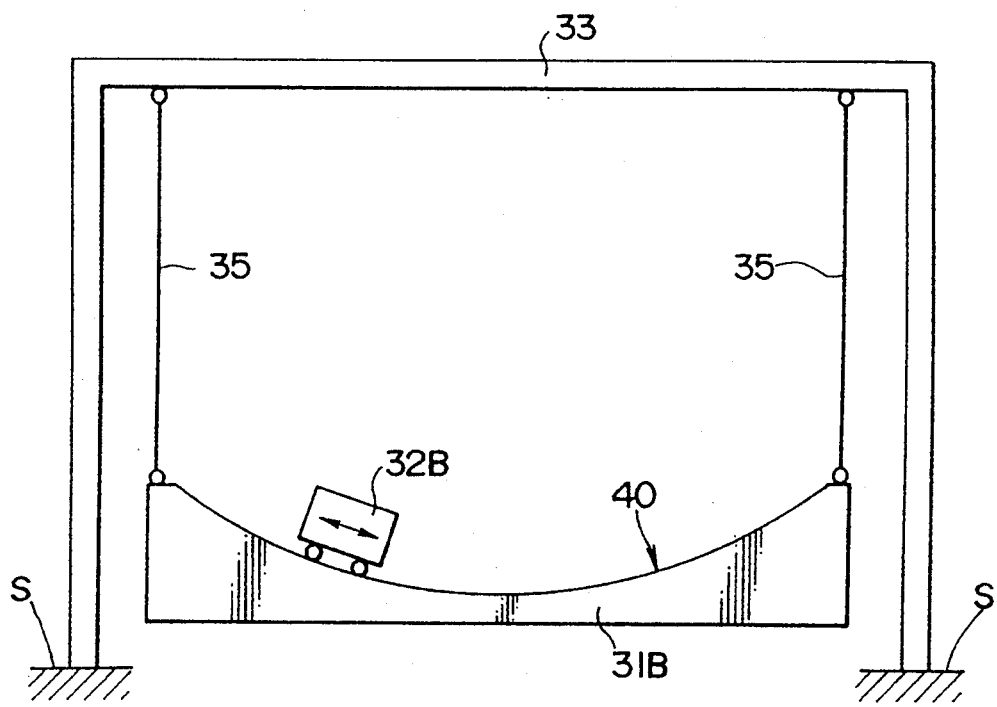
FIG. 7 is a schematic elevational view showing yet another combination of first support means and second support means for use in a preferred embodiment of the invention.

In the embodiment of FIG. 7, the hanger support of the first additional mass body 31B is similar to that shown in FIG. 5. A concave arcuately curved track 40 on the upper surface of the first additional mass body 31B is formed so that the second additional mass bodies 32B (of which only one is shown) may be vibrated on the track 40. As drive means for the second additional mass bodies 32B, a linear motor or the like is contemplated, although other prior art drive means are acceptable. In order to prevent interference between two-directional second additional mass bodies 32B, the mass bodies may be spaced apart, such as shown in FIGS. 1 and 2, or the support tracks may be positioned on different planes, such as shown in FIGS. 3 and 4.

Figure 8:
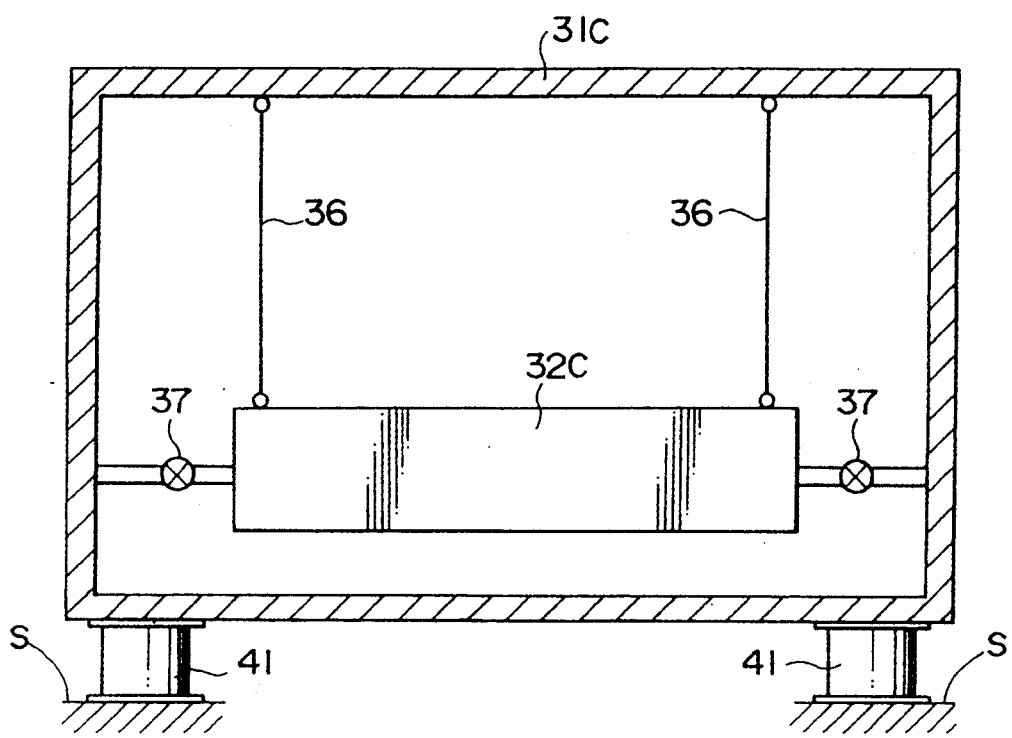
FIG. 8 is a schematic elevational view, partially in section, showing a combination of first support means and second rubber support means as a preferred embodiment of the invention.

In the embodiment of FIG. 8, the first additional mass body 31C constituting a chamber is supported by laminated rubber supports 41, which rest on a structure S. The second additional mass body 32C is supported by the hanger means 36 within the first additional mass body 31C. The mass body 32C is vibrated by actuators 37 in the same manner as the device of FIG. 5.

Figure 9:
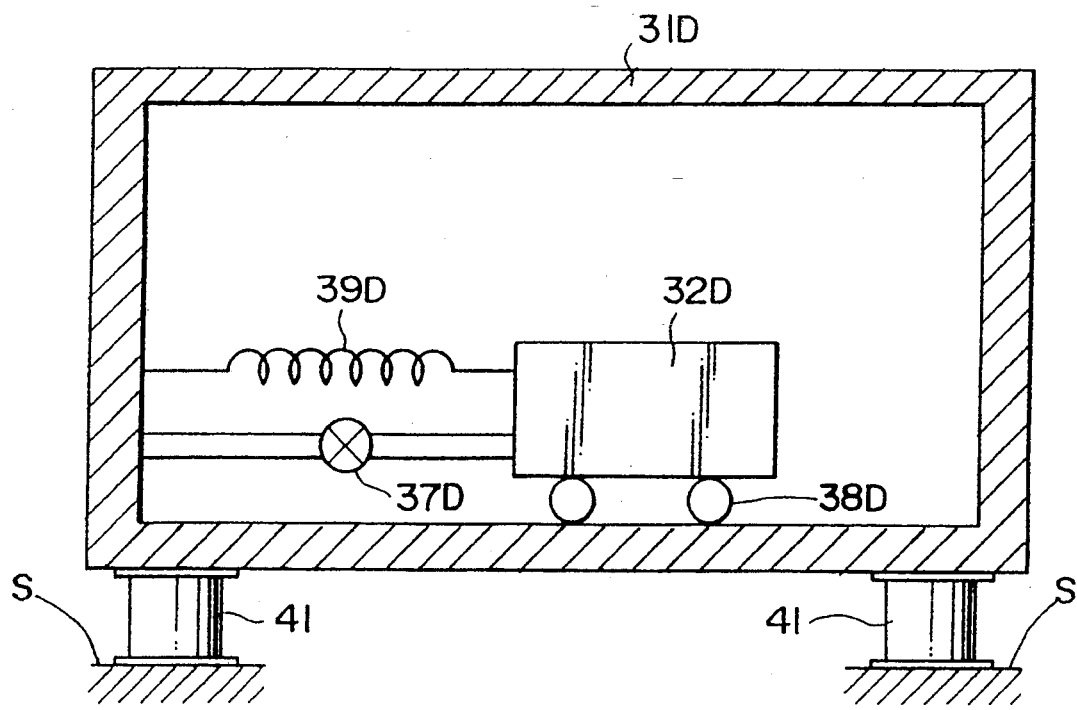
FIG. 9 is a schematic elevational view, partially in section, showing another combination of first support means and second rubber support means as another preferred embodiment of the invention.

In the embodiment of FIG. 9, the first additional mass body 31D chamber is supported by the laminated rubber supports 41, the same as in FIG. 8, and the second additional mass body 32D is mounted on anti-friction rollers 38D, the same as shown in FIG. 6. The second additional mass body 32D is connected to the first additional mass body 31C through the coil spring 39D, which is in parallel with actuator 37D, interconnected between mass body 31D and mass body 32D.

Figure 10:
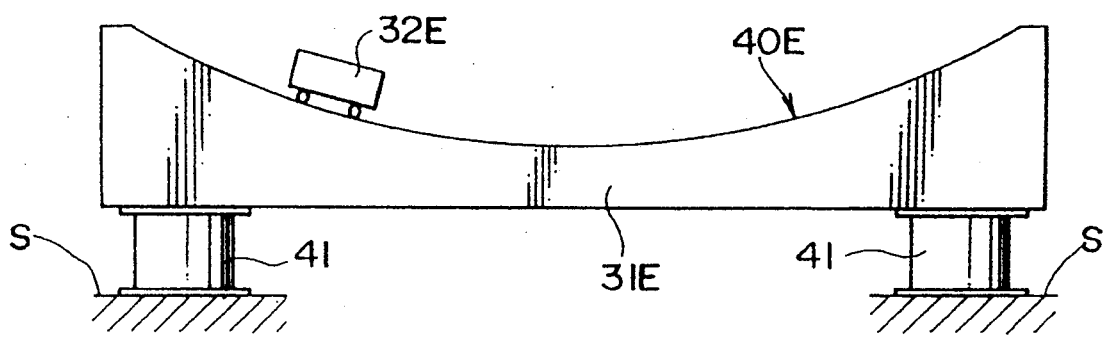
FIG. 10 is a schematic elevational view showing yet another combination of first support means and second rubber support means as yet another embodiment of the invention.

In the embodiment of FIG. 10, the arcuate track 40E, on which the second additional mass body 32E travels, is formed on the upper surface of the first additional mass body 31E supported by the laminated rubber supports 41. Rubber supports 41 permit first additional mass body 31E to shift substantially horizontally in any direction. The movement of second additional mass body 32E is restricted to reciprocal arcuate movement on arcuate track 40E.

Figure 11:
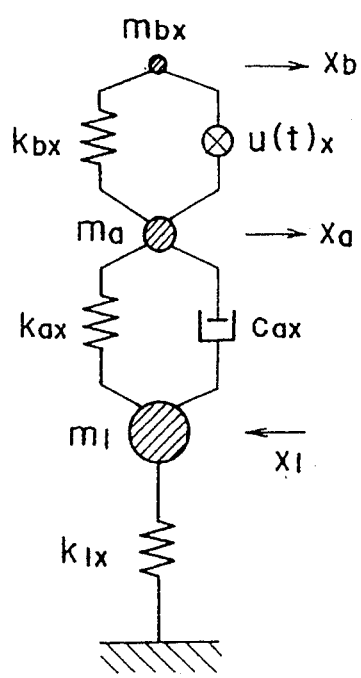
FIG. 11 is a vibration model schematic diagram showing a vibration control device of the present invention with respect to a uni-directional source of vibration.
Figure 12:
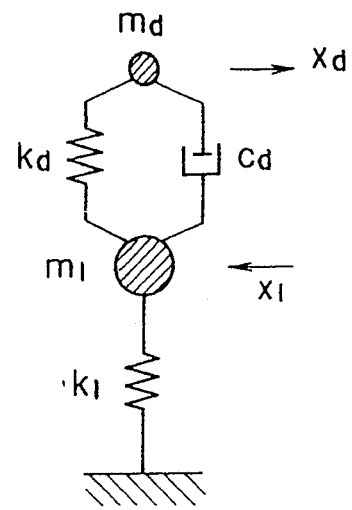
FIG. 12 is a vibration model schematic diagram showing a dynamic damper of the prior art.
Figure 13:
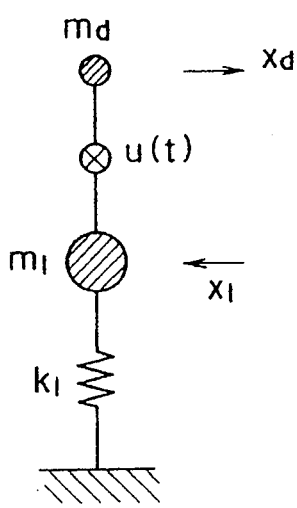
FIG. 13 is a vibration model schematic diagram showing an active mass damper of the prior art.
Figure 14:
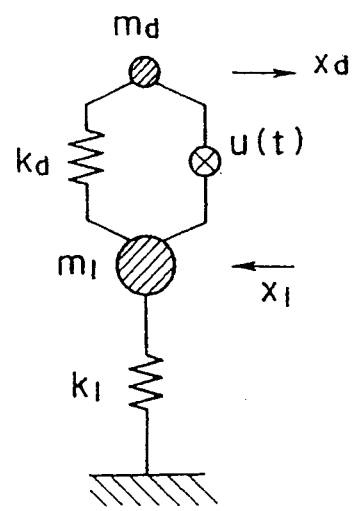
FIG. 14 is a vibration model schematic diagram showing an active tuned mass damper of the prior art.

In FIG. 11, $m_1$ indicates a mass of a structure constituting a main vibration system, $m_a$ indicates a mass of a first additional mass body, and $m_{bx}$ indicates a mass of a second additional mass body functioning in the x-axial direction. Further, $k_{lx}$ indicates a spring constant in the x-axial direction of the main body of the structure, $k_{ax}$ indicates a spring constant of support means in the x-axial direction, $c_{ax}$ indicates a damping coefficient of the support means in the x-axial direction, $k_{bx}$ indicates a spring constant between the first additional mass body and the second additional mass body functioning in the x-axial direction, and $u(t)_x$ indicates a control force in the x-axial direction, respectively. The symbol x indicates a displacement of the structure, $x_a$ indicates a displacement of the first additional mass body, and $x_b$ indicates a displacement of the second additional mass body, respectively. In addition, a vibration control device of the present invention includes a second additional mass body having a mass $m_{by}$ functioning in the y-axial direction (normally a direction perpendicular to the x-axial direction, but selectable according to the sectional shape of the structure), so that it may be possible to control in all directions within a horizontal plane by controlling in the x-axial and y-axial directions, respectively.

Since it is possible to control in all directions within a horizontal plane by controlling in the x-axial and y-axial directions, respectively, as described above, the explanation of an embodiment in the x-axial direction only follows.

The mass of the first additional mass body is assumed to be approximately from 1/50 to 1/1000 of the mass of the structure, e.g., in accordance with the scale of the structure, vibration characteristics and control means. The mass of the second additional mass body is also assumed to be approximately from 1/10 to 1/100 of the mass of the first additional mass body.

By use of the parameters shown in FIG. 10, the angular frequencies $$\omega_{1x}, \omega_{ax} \text{ and } \omega_{bx}$$

of a main vibration system and the first and second additional mass bodies are represented by the following.

$$\omega_{1x} = (k_{1x}/m_1)^{\frac{1}{2}}$$

$$\omega_{ax} = (k_{ax}/m_a)^{\frac{1}{2}}$$

$$\omega_{bx} = (k_{bx}/m_b)^{\frac{1}{2}}$$

By synchronizing the angular frequencies with one another, the following relation can be established.

$$\omega_{1x} \approx \omega_{ax} \approx \omega_{bx}$$

There are, however, some cases of applying a conventional AMD-like control by setting $\omega_{bx}$ as a sufficiently small value in comparison with those of $\omega_{1x}$ and $\omega_{ax}$ without synchronizing with one another.

Furthermore, the relationship among the mass of the structure, the mass of the first additional mass body and the mass of the second additional mass body as described above can be represented by:

$$m_a/m_1 = 1/50 \text{ through } 1/1000$$

$$m_{bx}/m_a = 1/10 \text{ through } 1/1000$$

A control force for controlling the movement of a driver as the second additional mass body is defined by the following equation, e.g., $$u(t)_x = G_1(d_{x1}/dt) + G_2(x_a - x_1) + G_3(d_{xb}/dt) + G_4(x_b - x_a) \quad (1)$$

wherein each of $G_1$, $G_2$, $G_3$ and $G_4$ is a gain in each term of the above equation (1), respectively.

Energy is mainly consumed by a damper function (damping coefficient $c_{ax}$) relative to the first additional mass body.

Since the angular frequency $\omega_{ax}$ of the first additional mass body is synchronized with the angular frequency $\omega_{1x}$ of the main vibration system, it forms a dynamic damper (dynamic vibration reducer). It is, however, desirable to slightly increase the damping coefficient $c_{ax}$ to the first additional mass body in comparison with the optimum design value of the dynamic damper.

Then, the control force $u(t)_x$ is applied so that the first additional mass body (mass $m_a$) is vibrated. In case of the above equation (1), the speed ($d_{x1}/dt$) of the structure is fed back, and the first additional mass body (mass $m_a$) can amplify the motion of a normal DD (dynamic damper), resulting in the increase in vibration control effect.

The reaction force from the control force $u(t)_x$ is treated by use of the inertial force from the second additional mass body (mass $m_{bx} = 1/10 \ m_a$ through $1/1000 \ m_a$).

The third term in the above equation (1) is available for providing a damping property to the second additional mass body as well by use of the relationship of action and reaction, and the vibration stabilization for the second additional mass body can be attained.

Furthermore, the spring force (spring constant $k_{bx}$) absorbs the greater part of the force needed to control when the angular frequency $\omega_{bx}$ of the second additional mass body is also synchronized with the angular frequency $\omega_{1x}$ of the main vibration system by use of the principle of the ATMD described above, and therefore the necessary force for the control becomes even smaller.

A control force $[u(t)_x]$, an inertial force $[m_{bx}(d_{xb}/dt)^2]$ and a spring force $[k_{bx}(x_b - x_a)]$ act on the second additional mass body, and the following relation is given by:

(Control Force) + (Inertial Force) + (Spring Force) = 0

Therefore, the inertial force and the spring force cancel each other, so that the control force can be less.

It will be understood that the above-described embodiments of the invention are for purpose of illustration only. Additional embodiments, modifications, and improvements can be readily anticipated by those skilled in the art based on a reading and study of the present disclosure. Such additional embodiments, modifications, and improvements may be fairly presumed to be within the spirit, scope, and purview of the invention as defined in the claims.

We claim:

1. In the combination of a structure and a seismic vibration control device supported on said structure, the improvement comprising: a first vibratable mass vertically spaced above said structure; first support means resting on said structure to support said first vibratable mass; a second vibratable mass supported by said first vibratable mass with second support means; means to control the period of said first vibratable mass; and means to control the vibration of said second vibratable mass.

2. The combination of claim 1, said first vibratable mass having a preselected natural period determined by the natural period of said structure.

3. The combination of claim 1, said means to control the vibration of said second vibratable mass comprising a servo motor and a threaded shaft reciprocably driven by said servo motor, said threaded shaft being threadedly and drivingly connected to said second vibratable mass.

4. The combination of claim 3, including a first pair of opposed second vibratable masses, each being reciprocably driven by a servo motor, and a threaded shaft reciprocably driven by said servo motor and drivingly interconnected between said servo motor and said second vibratable masses.

5. The combination of claim 3, including a second pair of opposed vibratable masses, each being reciprocably driven by a servo motor and a threaded shaft reciprocably driven by said servo motor and drivingly interconnected between said servo motor and said second vibratable masses.

6. The combination of claim 4, including a seismic vibration sensor secured to each of said first pair of opposed second vibratable masses adapted to control said servo motor.

7. The combination of claim 5, including a seismic vibration sensor secured to each of said second pair of opposed second vibratable masses.

8. The combination of claim 5, said first vibratable mass being channel shaped, said second vibratable mass being secured to the top surface of said first vibratable mass to bridge said channel, and said third vibratable mass being positioned in and secured to said channel transverse to said second vibratable mass.

9. The combination of claim 3, including spring biasing means mounted in parallel to said threaded shaft, connected between said first and second vibratable masses and adapted to return said additional vibratable mass to a neutral position when not being vibrated.

10. The combination of claim 1, wherein said first vibratable mass comprises a hollow cube.

11. The combination of claim 1, including suspension means secured to said first support means to depend therefrom and secured to said first vibratable mass to suspend said first vibratable mass from said support means in a manner adapted to provide substantially universal horizontal movement of said first vibratable mass.

12. The combination of claim 11, wherein said second support means rests on said first vibratable mass; means to suspend said second vibratable mass from said second support means for linear movement in a substantially horizontal plane; and means to control said linear movement.

13. The combination of claim 1, including means to suspend said first vibratable mass from said first support means by suspension means adapted to provide substantially universal horizontal movement of said first vibratable mass; anti-friction means to support said second vibratable mass on said first vibratable mass; control means connected between said first vibratable mass and said second vibratable mass to control the movement of said second vibratable mass in a substantially horizontal direction; and spring means in parallel with said control means connected between said first vibratable mass and said second vibratable mass to bias said second vibratable mass.

14. The combination of claim 1, including means to suspend said first vibratable mass from said first support means by suspension means adapted to provide universal movement of said first vibratable mass over a substantially horizontal plane, said first vibratable mass having an upper surface which is arcuately concave, and anti-friction means to support said second vibratable mass on said arcuately concave upper surface of said first vibratable mass for linear movement thereon.

15. The combination of claim 1, wherein said first support means comprise elastoplastic pads secured between said structure and said first vibratable mass adapted to permit universal movement of said first vibratable mass in a substantially horizontal plane, and wherein said second support means comprise suspension means secured to and depending from said first vibratable mass and secured to said second vibratable mass to suspend said second vibratable mass from said first vibratable mass in a manner adapted to permit said second vibratable mass to move in a substantially linear path, and means to control the movement of said second vibratable mass in said linear path.

16. The combination of claim 15, said first vibratable mass comprising a top, a bottom, and a pair of opposed and spaced apart sides secured to said top and said bottom, said suspension means being secured to said top of said first vibratable mass.

17. The combination of claim 1, wherein said first support means comprise elastoplastic pads secured between said structure and said first vibratable mass adapted to permit universal movement of said first vibratable mass over a substantially horizontal plane responsive to seismic vibration, said second vibratable mass being supported by said first vibratable mass on anti-friction means adapted to provide linear movement of said second vibratable mass on said first vibratable mass; control means secured between said first vibratable mass and said second vibratable mass adapted to control the said linear movement of said second vibratable mass; and spring means parallel to said control means and secured between said first vibratable mass and said second vibratable mass adapted to bias said second vibratable mass.

18. The combination of claim 17, said first vibratable mass comprising a top portion, a bottom portion, and a pair of opposed and spaced apart end portions secured to said top portion and to said bottom portion, said second vibratable mass being adapted to be shifted on said bottom portion.

19. The combination of claim 1, wherein said first vibratable mass has an arcuately concave top surface, said second vibratable mass is mounted on anti-friction means adapted to permit linear movement of said second vibratable mass on said arcuately concave top surface of said first vibratable mass; and said first support means comprises elastoplastic pads secured between said structure and said first vibratable mass which are adapted to permit universal movement of said first vibratable mass over a substantially horizontal plane responsive to seismic vibration.

20. The combination of claim 19, wherein the elastoplastic pads are comprised of a substantially rubber substance.

21. The combination of claim 1, including a third vibratable mass secured to said first vibratable mass, said first vibratable mass being positioned on a first horizontal plane; said second vibratable mass being positioned on a second horizontal plane; said third vibratable mass being positioned on a third horizontal plane; and means to vibrate said third vibratable mass in a controlled manner.

* * * * *

UNITED STATES PATENT AND TRADEMARK OFFICE
CERTIFICATE OF CORRECTION

PATENT NO. : 5,421,129

DATED : June 6, 1995

INVENTOR(S) : Sakamoto et al.

It is certified that error appears in the above-identified patent and that said Letters Patent is hereby corrected as shown below:

Column 10:
Claim 8, line 46, change "5" to --21--.

Column 1, line 62, change "AMP" to --AMD--.

Column 2, line 48, change "tile" to --the--.

Signed and Sealed this

Twelfth Day of September, 1995

BRUCE LEHMAN

Attest:

Attesting Officer    Commissioner of Patents and Trademarks